July 20, 1943.  T. L. DALTON  2,324,614
SIGNAL
Filed Sept. 9, 1940
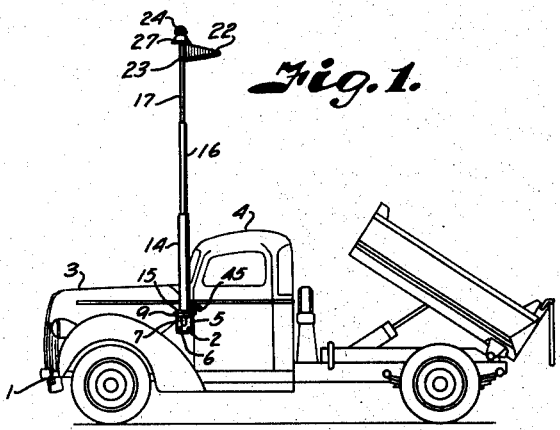
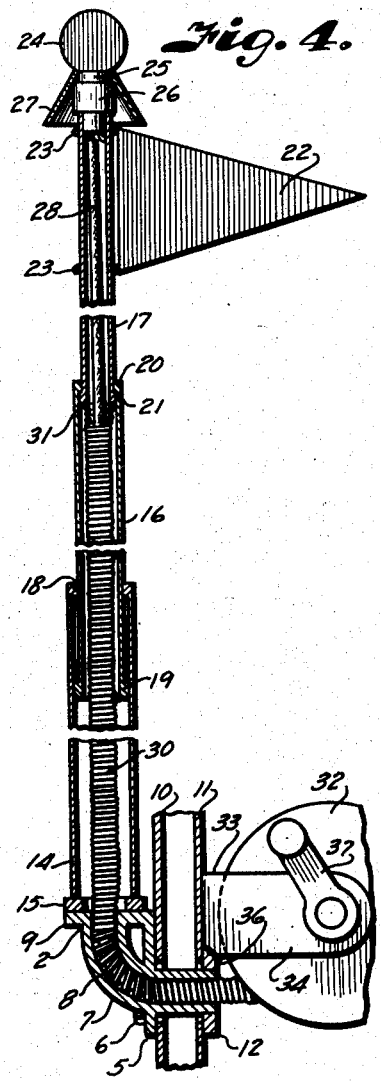
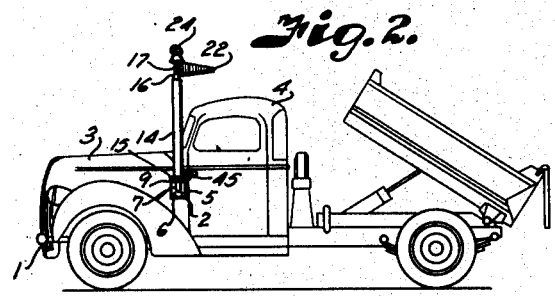
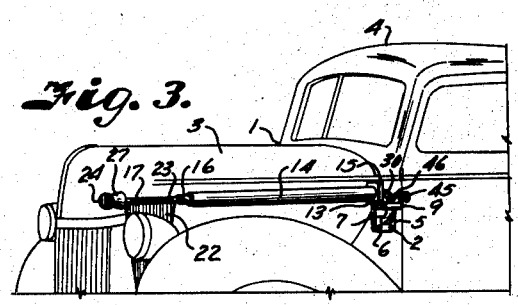
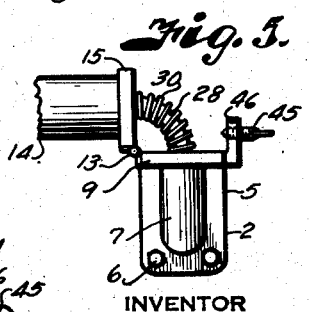
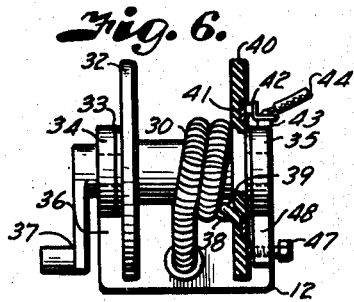
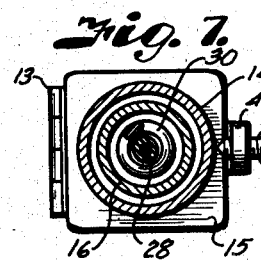
INVENTOR
Thomas L. Dalton.
BY
ATTORNEY Patented July 20, 1943

2,324,614

UNITED STATES PATENT OFFICE 2,324,614

SIGNAL

Thomas L. Dalton, Kansas City, Mo.

Application September 9, 1940, Serial No. 356,008

6 Claims. (Cl. 116—28)

This invention relates to signals and more particularly to warning signals for use on trucks and like equipment engaged in installation or maintenance work on roadways, and for other purposes such as on boats where position signals are desirable; the principal objects of the invention being to provide a convenient, relatively economical, efficient and effective warning signal.

In carrying out roadway, highway or utility maintenance operations, it is sometimes necessary to park equipment and/or vehicles directly on the right-of-way and/or on crowns of hills and adjacent highway stretches, thus creating a hazard for traffic approaching the scene of maintenance operations from opposite directions.

It has been found that a pole or the like of sufficient height to be raised to a position that can be seen by approaching traffic may be effectively utilized for carrying warning signals.

Other objects of the invention are, therefore, to provide highway maintenance equipment such as trucks with poles of sufficient height to be seen by approaching traffic; to provide such poles with active warning signals; to provide for adjusting the poles to the height necessary to be effective; to provide for carrying the pole in a convenient manner on the truck; to protect the active signal devices; to provide for braking movements of the warning signals and/or locking the same in desired position; and to provide improved elements and arrangements thereof in a signal of the character and for the purpose noted.

In accomplishing these and other objects of the present invention I have provided improved details of structure, the preferred form of which is illustrated in the accompanying drawing wherein:

Fig. 1 is a side elevational view of a truck equipped with a signal embodying the features of the present invention, the same being shown in raised operative condition.

Fig. 2 is a view somewhat similar to Fig. 1 showing the warning signal in contracted semi-operative condition.

Fig. 3 is a detail perspective view of the truck and signal shown in Figs. 1 and 2, the signal being shown in contracted inoperative condition.

Fig. 4 is a detail vertical cross section through the signal showing the relation of its several parts.

Fig. 5 is a detail side elevational view of a supporting bracket for the signal showing the relation of the signal thereto when in inoperative condition.

Fig. 6 is a detail elevational view of the winding drum for the signal actuating device, parts thereof being shown in vertical cross section to illustrate the manner of activating the signal.

Fig. 7 is a detail horizontal cross-section through the signal showing the telescoping arrangement thereof and the manner of locking the same in operative position.

Referring more in detail to the drawing:

1 designates suitable maintenance equipment, such as a truck, that is provided with a supporting bracket generally designated 2 arranged on or adjacent the motor hood 3 of the truck and in convenient relation to the cab 4 of the truck in such a manner that it is accessible to an operator of the truck from his normal position in the cab thereof.

More particularly the bracket 2 preferably consists of a plate 5 secured to the cab body as by fastening devices 6, the plate having a socket 7 therein of tubular character, the interior of which forms a channel 8 extending from an annular flange 9 at the upper end of the bracket through the socket and the bracket. The socket 7 extends through the walls 10 and 11 of the cab body and terminates in a flange 12 that is suitably secured to the inner wall 11 of the body at a convenient position adjacent the operator of the equipment.

Hingedly mounted on the flange 9 of the bracket 2, as indicated at 13, is a preferably tubular member 14 provided with a lower annular flange 15 that seats upon the flange 9 to maintain the tubular member erect and which may be hinged away from the flange 9 and bracket 2 into an "out-of-the-way" inoperative position as shown in Fig. 3. The tubular member 14 has telescoping sections 16 and 17 applied thereto, the telescoping sections being provided with interengageable flanges 18, 19, 20 and 21 for limiting outward telescopic action of the sections.

The upper or outermost telescoping section is preferably provided with a signalling device 33 such as a flag, pennant, or the like, that is suitably secured thereto, as by fastening devices 23. The upper or outer extremity of the telescopic section 17 is also preferably provided with a signalling device 24 such as a light. The light is provided with a conventional base 25 adapted to fit a socket 26 that is mounted in the open end of the telescopic section 17 and a hood 27 is mounted on the light base and extends over the end of the section 17 in order to protect electrical connections of the socket 27 with electric wiring connections and a source of supply 28. The electric supply lines 28 pass through the hollow interior of the telescoping sections, through the annular flange 15 of the bottom section 14, through the annular flange of the bracket 2, and through the socket 7 into the interior of the cab 4 of the maintenance truck.

In order to provide for expansion and contraction of the telescopic sections relative to each other, to the end that the signal device on the pole formed by such sections may readily be seen by approaching motorists, a flexible shaft 30, which may be of a character similar to speedometer shafts, is mounted in the interior of the pole of telescopic sections. The outer or upper end of the flexible shaft 30 is suitably secured, as by welding 31 or the like, to the lower or inner face of the flange 21 on the outermost section 17, the shaft 30 being arranged in sleeved protectively shielding relation to the wires 28 and passing therewith through the pole sections, socket and bracket into the interior of the cab.

The relation of the socket 7 to the size or diameter of the flexible shaft is such that frictional engagement is effected between them in such a manner that the pole sections may be arranged in desired telescopic relation and held in such relation by frictional engagement between the flexible shaft and socket 7.

In order to actuate the flexible shaft, I preferably mount a drum 32 in rotatable relation to a bracket 33 comprising spaced arms 34 and 35 secured to a base 36 that preferably forms a part of the flange 12 within the cab and secured to the inner wall thereof. The drum 32 has suitable trunnions that bear in journals in the bracket arms 34 and 35 one of the drum trunnions being provided with a crank 37 for rotating the drum. The inner end 38 of the flexible shaft or cable 30 is secured to the drum as at 39, Fig. 6, and the electric line 28 terminates in secured relation to an insulated wall 40 of the drum in contact with a current conducting ring 41 mounted in the wall 40. Brushes 42 are preferably mounted on a post 43 that is suitably mounted on the arm 35 of the drum bracket and a current supply line 44 is also mounted on the post to supply the line 28 with current. The supply line 44 may lead to a suitable source of electric supply such as the customary battery or batteries carried by the truck.

Locking and braking devices are also preferably provided for the signal which devices respectively preferably include, as shown in Fig. 5 a thumb screw 45 that is mounted in an ear 46 arranged on or adjacent the flange 9 of the bracket 2. The thumb screw 45 is arranged at a height sufficient to be threaded into the ear 46 over the upper face of the flange 15 on the bottom wall section 14, as shown in Fig. 7, in order to lock the pole in erected position as shown in Figs. 1, 2 and 4.

The braking device preferably consists of a set screw 47, Fig. 6, that is mounted in an ear 48 on the drum support bracket 36 adjacent the wall 40 of the drum and in engageable relation to such wall 40, the set screw 47 being manipulatable to press inwardly on the wall 40 to limit its rotative movement.

The operation of a signal constructed as described is as follows:

Assuming the truck 1 to be provided with the signal pole and equipment therefor as described, the operator of the truck normally approaches the scene of highway maintenance operations with the signal in inoperative condition, as shown in Fig. 3. The signal pole may be hinged upwardly on the hinge 13 from the condition shown in Fig. 3 to the condition shown in Fig. 2, whereupon the thumb screw 45 may be manipulated to lock the flanges 9 and 15 together, thus locking the pole in erected condition.

Depending upon the position of the truck relative to traffic on the highway and the terrain, the operator may judge the height to which it is desirable to position the flag 22 and light 24. The crank 37 for the drum 32 may then be manipulated to rotate the drum in a clockwise direction, Fig. 4, to force the cable 30 outwardly through the socket 7 and act against the flange 21 of the outermost telescopic section 17 thus expanding that section relative to the section 16. Continued rotation of the drum expands the section 16 relative to the pole section 14 to position the flag and light at the desired height above the truck, as shown in Fig. 1. Frictional engagement of the cable with its socket normally holds the pole in desired raised condition, but if desired, the set screw 47 may be manipulated to effect engagement thereof with the wall 40 of the drum to positively lock the drum and flexible cable in desired pole raising condition.

A reversal of the described operations positions the warning signal back to the condition shown in Fig. 3, whereupon the operator of the truck may proceed to other localities for highway maintenance operations and reuse of the warning signal.

The signal is also particularly effective when used on slow moving equipment such as tractors, mowers and the like and may be raised and lowered to clear any obstructions such as trees, underpasses and wires.

It is apparent, therefore, that a convenient, relatively economical, efficient and effective warning signal for highway maintenance devices is provided by the present invention.

What I claim and desire to secure by Letters Patent is:

1. In an apparatus of the character described, a support, a warning signal mounted on the support, said warning signal including a telescopic pole, flexible means having sufficient rigidity to act as a column in compression attached to the outermost section of the pole and extending through said pole for raising and lowering said pole, and means on the support cooperative with the lower end of the pole for hinging said pole to operative and inoperative condition respectively.

2. In a device of the character described, a support, a bracket on the support, a telescopic pole hinged to said bracket, a signal device on said pole, means for energizing said signal device, flexible means having sufficient rigidity to act as a column in compression secured to the outermost section of said pole and extending therethrough and through said bracket, a drum engaged with said last named means, and means for actuating said drum for raising or lowering said pole.

3. In a device of the character described, a support, a socket on said support, a telescopic pole hingedly mounted on said socket, a signal device on said pole, means for activating said signal device, a drum on said support, flexible means having sufficient rigidity to act as a column in compression extending through said pole and secured at opposite ends respectively to the outermost section of said pole and to said drum, and means for actuating said drum to raise or lower said pole relative to said support.

4. In a device of the character described, a support, a bracket on the support, a telescopic pole hinged to said bracket, a signal device on said pole, means for energizing said signal device, flexible means having sufficient rigidity to act as a column in compression secured to the outermost section of said pole and extending therethrough and through said bracket, a drum engaged with said last named means, and means for actuating said drum for raising or lowering said pole, said bracket frictionally engaging the means extending therethrough and tending to hold the pole in the position to which it is moved by actuation of said drum.

5. In a device of the character described, a support, a bracket on the support, a telescopic pole hinged to said bracket, a signal device on said pole, means for energizing said signal device, flexible means having sufficient rigidity to act as a column in compression secured to the outermost section of said pole and extending therethrough and through said bracket, a drum engaged with said last named means, means for actuating said drum for raising or lowering said pole, and means engageable with the drum for braking the same.

6. In a device of the character described, a support, a bracket on the support, a telescopic pole hinged to said bracket, means on the bracket engageable with the pole for positively retaining the pole in erected condition, a signal device on said pole, means for energizing said signal device, flexible means having sufficient rigidity to act as a column in compression secured to the outermost section of said pole and extending therethrough and through said bracket, a drum engaged with said last named means and means for actuating said drum for raising or lowering said pole.

THOMAS L. DALTON.